United States Patent Office 2,898,218
Patented Aug. 4, 1959

---

2,898,218

PORCELAIN ENAMELS

Wendell G. Voss, Bay Village, and Francis C. Ellinger, Parma, Ohio, assignors to Ferro Corporation, Cleveland, Ohio, a corporation of Ohio No Drawing. Application February 6, 1957
Serial No. 638,436

11 Claims. (Cl. 106—48)

This invention relates as indicated to porcelain enamels and has particular reference to porcelain enamels with a metallic finish.

Glazes for ceramic bodies having a metallic finish, known to the art as lusters, have been known as far back as the ancient Egyptians. These lusters are a film-like coating of metal or metallic oxide matured on the surface of the glaze.

We have now discovered certain new porcelain enamel compositions which when fired on an iron or steel article will produce a metallic finish. Of further importance our metallic lusters are produced in a single coat of porcelain enamel without a covering of a film-like coating of metal or metallic oxide.

It is therefore the principal object of this invention to provide porcelain enamel compositions which when applied to and fired on a ferrous work piece produces a metallic finish.

A further object of this invention is to provide porcelain enamel compositions which have a noble metal luster without the use of noble metals.

Other objects will become apparent as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated the present invention comprises a porcelain enamel composition comprising a non-opacified borosilicate porcelain enamel, the total alkali metal content of said porcelain enamel being from about 8.5% to about 21.5% and the $Na_2O$ content comprising from about 60.5% to about 88.25% of the total alkali metal content and said porcelain enamel always containing from about 0.8% to about 3.5% $F_2$ and from about 9.0% to about 19.0% $MnO_2$.

From the foregoing broadly stated paragraph it will be seen that the constituents entering into the porcelain enamel compositions of this invention may vary within considerable limits providing the total alkali metal content is from about 8.5% to about 21.5% and the $Na_2O$ comprising from about 60.5% to about 88.25% of the total alkali metal; the $F_2$ is from about 0.8% to about 3.5% and the $MnO_2$ from about 9% to about 19.0%.

There are innumerable non-opacified borosilicate porcelain enamel compositions known to those skilled in the art. Any of these basic non-opacified borosilicate formulations are applicable to the present invention providing $Na_2O$, $F_2$ and $MnO_2$ are added in the amounts indicated above. Thus for example a porcelain enamel composition such as the following is typical of hundreds of basic formulations to which the proper amounts of $Na_2O$, $F_2$ and $MnO_2$ can be added to produce a porcelain enamel which when fired on a ferrous article produces a metallic luster.

I

| | Percent by weight |
|---|---|
| $B_2O_3$ | 22.00 |
| $Sb_2O_5$ | 3.00 |
| $P_2O_5$ | 5.00 |
| NiO | 0.20 |
| $SiO_2$ | 58.00 |
| $K_2O$ | 12.00 |
| | 100.20 |

While the foregoing example illustrates one borosilicate porcelain enamel formulation useful in the present invention, it will be seen that this composition contains $P_2O_5$. $P_2O_5$ is not essential to the development of the metallic finish of the porcelain enamels of our invention; however, we have found that $P_2O_5$ contributes to the proper fit between the porcelain enamel of our invention and the metal work piece. Thus in the preferred embodiment of our invention we use a non-opacified borosilicate formulation containing up to 5.0% $P_2O_5$.

Using the above basic borosilicate porcelain enamel and adding $Na_2O$, $F_2$ and $MnO_2$ as follows, a composition is obtained which will produce a metallic luster.

II

| | Percent by weight |
|---|---|
| $Na_2O$ | 9.00 |
| $K_2O$ | 3.00 |
| $B_2O_3$ | 16.00 |
| $Sb_2O_5$ | 3.00 |
| $P_2O_5$ | 4.00 |
| $MnO_2$ | 11.00 |
| NiO | 0.20 |
| $SiO_2$ | 51.00 |
| $F_2$ | 3.00 |
| | 100.20 |

The foregoing examples are based on the oxide composition of the raw batch. Thus any raw materials which yield the aforegoing oxides can be used, merely by calculating the amount of raw material which will yield the necessary amount of oxide.

The following example is used to illustrate another typical formulation (based on the raw batch) which when thoroughly admixed and smelted will produce a porcelain enamel of the present invention:

III

| | Lbs. |
|---|---|
| Powdered quartz | 1400 |
| Sodium antimonate | 98 |
| Potassium silico-fluoride | 165 |
| Dehydrated borax | 650 |
| Sodium nitrate | 128 |
| Potassium nitrate | 55 |
| Manganese dioxide | 430 |

However, it is again iterated that any of the well known non-opacified borosilicate porcelain enamel formulations can be used, providing of course, that the formula is adjusted so that the total alkali metal content is from about 8.5% to about 21.5% and the $Na_2O$ being about 60.5% to about 88.25% of the total alkali metal content, the fluorine content is from about 0.8% to about 3.5% and the $MnO_2$ is from about 9% to about 19%.

It is also of importance to note that the fluorine and manganese are added to a porcelain enamel formulation in an inverse relationship. That is, if the fluorine level is increased the manganese level must be decreased. We have found that a combination of high fluorine and high manganese produces a porcelain enamel which when fired on a ferrous work piece results in a scummy or mattefinish. The combination of low fluorine and low manganese gives a conventional appearing enamel with no metallic luster.

In preparing porcelain enamels embodying the constituents and properties previously described the raw batch may be smelted at temperatures of from about 2100° F. to about 2500° F. We have found that smelting temperatures of from about 2200° F. to about 2300° F. are preferred. The porcelain enamels after smelting are then converted into small fragments as by fritting and then subjected to milling.

During the milling operation the frit is milled with typical mill additions well known to those skilled in the art. For the sake of clarity a typical milling is given.

IV

To 800 lbs. of a porcelain enamel frit of this invention is added

| | Lbs. |
|---|---|
| Clay | 32 |
| $NaNO_2$ | 2 |
| $CuCl_2$ | 2 |
| Urea | 4 |
| $H_2O$ | 320 |

When milled to the desired fineness the "slip" may then be applied to a ferrous article. The slip may be applied directly to the iron or it may be applied over a previously applied ground coat, or it may be applied to a previously applied cover coat. In other words the choice of surface to which the porcelain enamels of the present invention are applied is dependent upon the final metallic color desired. We have found that the porcelain enamels of this invention can best be fired on a ferrous work piece at temperatures of from about 1400° F. to about 1600° F.

Attention is directed to the foregoing mill addition. It will be seen that $CuCl_2$ was used as an ingredient in the mill. We have found that while the $CuCl_2$ is not essential for the production of the metallic finish the use of the $CuCl_2$ aids in producing a particularly strong and desirable golden luster.

It should be understood that the foregoing examples have been given as exemplary of the many basic non-opacified borosilicate porcelain enamel formulations which can be used in the present invention.

Other modes of applying the principle of the invention may be employed, change being made as regards the details described, provided the features stated in any of the following claims or the equivalent of such be employed.

We, therefore, particularly point out and distinctly claim as our invention:

1. A porcelain enamel composition consisting essentially of a non-opacified, borosilicate porcelain enamel, the total alkali metal content of said porcelain enamel being from about 8.5% to about 21.5% and the $Na_2O$ comprising from about 60.5% to about 88.25% of the total alkali metal content and said porcelain enamel containing from about 0.8% to about 3.5% $F_2$ and from about 9.0% to about 19.0% $MnO_2$.

2. A porcelain enamel as set forth in claim 1 wherein the fluorine and manganese are added to the porcelain enamel composition in inverse relationship.

3. An aqueous suspension of porcelain enamel consisting essentially of a milled porcelain enamel as set forth in claim 1 and about 0.25% by weight of the frit of $CuCl_2$ as a mill addition agent.

4. A porcelain enamel composition consisting essentially of a non-opacified borosilicate porcelain enamel, said composition containing up to 5.0% $P_2O_5$, the total alkali metal content of said composition being from about 8.5% to about 21.5% and the $Na_2O$ comprising from 60.5% to about 88.25% of the total alkali metal content and said composition containing from about 0.8% to about 3.5% $F_2$ and from about 9.0% to about 19.0% $MnO_2$.

5. An aqueous suspension of porcelain enamel consisting essentially of a milled porcelain enamel as set forth in claim 4 and about 0.25% by weight of the frit of $CuCl_2$ as a mill addition agent.

6. The method of producing a porcelain enamel frit which consists essentially of thoroughly admixing the raw batch ingredients of a non-opacified borosilicate porcelain enamel formulation, said formulation having a total alkali enamel content of from about 8.5% to about 21.5% and the $Na_2O$ comprising from about 60.5% to about 88.25% of the total alkali metal content and said formulation containing from about 0.8% to about 3.5% $F_2$ and from about 9.0% to about 19% $MnO_2$, smelting said admixture at from about 2100° F. to about 2500° F. until substantially completely molten and then fritting said molten mass.

7. The method of producing a porcelain enamel frit consisting essentially of thoroughly admixing the raw batch ingredients of a non-opacified borosilicate porcelain enamel formulation, said formulation containing up to 5.0% $P_2O_5$, the total alkali metal content of said formulation being from about 8.5% to about 21.5% and the $Na_2O$ comprising from about 60.5% to about 88.25% of the total alkali metal content and said formulation containing from about 0.8% to about 3.5% $F_2$ and from about 9.0% to about 19% $MnO_2$, smelting said admixture at from about 2100° F. to about 2500° F. until substantially completely molten and then fritting said molten mass.

8. A method for applying a metallic finish to a ferrous article which comprises milling the frit as set forth in claim 6 in water in the presence of about 0.25% by weight of the frit of $CuCl_2$, applying said milled frit to the ferrous article and firing said coated article at from about 1400° F. to about 1600° F.

9. A method for applying a metallic finish to a ferrous article which comprises milling the frit as set forth in claim 7 in water in the presence of about 0.25% by weight of the frit of $CuCl_2$, applying said milled frit to the ferrous article and firing said coated article at from about 1400° to about 1600° F.

10. An article of manufacture comprising the product of claim 8.

11. An article of manufacture comprising the product of claim 9.

References Cited in the file of this patent
UNITED STATES PATENTS

| 2,391,468 | Long | Dec. 25, 1945 |
| 2,537,955 | Baldwin | Jan. 16, 1951 |
| 2,542,043 | McIntyre et al. | Feb. 20, 1951 |
| 2,604,410 | Bryant | July 22, 1952 |